United States Patent Office 3,499,727
Patented Mar. 10, 1970

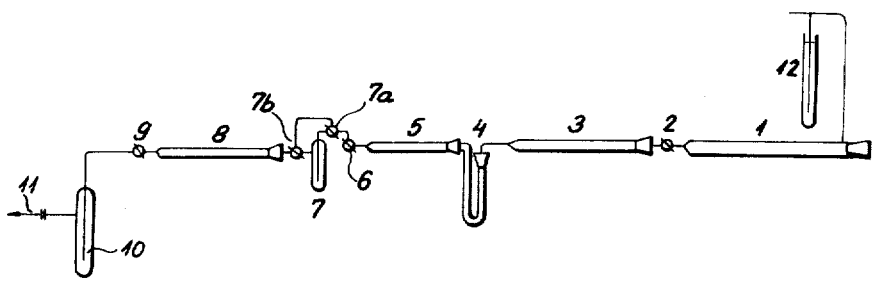

3,499,727
PROCESS AND EQUIPMENT FOR PREPARING $^{14}$C-LABELLED ALKALI METAL CYANIDES
Dezsö Bánfi, Sándor Mlinkó, and Tivadar Palágyi, Budapest, Hungary, assignors to MEDIMPEX Gyogyszerkulkereskedelmi Vallalat, Budapest, Hungary
Filed Aug. 30, 1966, Ser. No. 576,088
Int. Cl. C01c 3/10; C07b 23/00
U.S. Cl. 23—79                    1 Claim This invention relates to a process for preparing $^{14}$C-labelled alkali metal cyanides from Ba$^{14}$CO$_3$. Further the invention relates to the equipment for carrying out this process.

It is known that the two most important compounds necessary for the work carried out by the aid of compounds labelled with $^{14}$C isotope are the Ba$^{14}$CO$_3$ and the K$^{14}$CN, the latter being always prepared from Ba$^{14}$CO$_3$. The known processes for preparing K$^{14}$CN show, however, several disadvantages and are not satisfactory.

The syntheses of K$^{14}$CN using labelled barium carbonate, ammonium chloride and potassium metal or labelled carbon dioxide, ammonia and potassium metal have to be carried out in a pressure-tight tube ("bomb tube"); consequently, these processes cannot be held in hand. Moreover, these methods are concomitant with a high danger of explosion and thereby with a danger of radioactive contamination. Namely, in the case of explosion, not only the total amount of the radioactive compound is destroyed but the dispersion of the activity causes a heavy problem of decontamination as well.

According to a further known process, labelled alkali cyanides are prepared from a mixture of Ba$^{14}$CO$_3$ and the corresponding alkali azide. This reaction cannot be held in hand either, and the yields are even lower than in the case of reactions carried out in bomb tubes.

Practically none of the known processes can be considered as suitable for industrial production. Moreover, known processes are batch-type and based on chemical reactions which even under exact experimental conditions are not yet fully known. Thus, the most important parameters of these chemical processes cannot be influenced and controlled. Consequently, these reactions do not proceed quantitatively. According to our measuring data, these syntheses can be reproduced in average only the yields of 60 to 65%, at most 75%.

The materials of construction of the equipment currently used for these processes become deformed in the reaction carried out at high (600–1000° C.) temperatures, they corrode and often get damaged on account of explosion. Consequently, the above-mentioned moderate yields cannot be kept constant, and the final product becomes contaminated. Due to the frequent breakings and explosions the radioactive substances become smeared and dispersed over a large area, often causing insolvable decontamination problems, contaminating the surroundings and constituting a health hazard for the workers, the C-14 isotope having a half-life of 5400 years.

Further problems are caused by the fact that a great part of the chemical and radiochemical contaminants always present in the Ba$^{14}$CO$_3$ is carried along into the alkali-metal cyanide product. During the cumbersome realization of batch processes of this kind, a considerable part of the radioactive material gets smeared or adsorbed on various parts of the apparatus, on the filters and on the surface of the residual or intermediate solid substances. Therefore, to recover efficiently the radioactive substance introduced into the reaction, that is, for increasing the radioactive yield, an inactive carrier has to be used as diluent, thereby extremely lowering the specific activity of the final labelled alkali-metal cyanide product. However, for the multi-step syntheses of labelled organic compounds based on alkali cyanides as raw material, cyanides of high specific activity are a precondition.

The object of the invention is to eliminate the disadvantages of the known processes and to ensure a process and an equipment, by the aid of which alkali cyanides labelled with C-14 isotope can be prepared from Ba$^{14}$CO$_3$ with practically quantitative yields, and at a low price in a continuous and safe process, without the danger of dispersing the activity.

The invention is based on the discovery that these objects can be attained, and at the same time it is rendered possible that during the syntheses only a very slight amount of the labelled compounds be simultaneously present in gaseous phase if the Ba$^{14}$CO$_3$ is thermally decomposed, and the carbon dioxide being formed is transformed through methane, in the presence of ammonia and a suitable catalyst, to hydrogen cyanide.

A further basis of the invention is the recognition that the thermal decomposition of barium carbonate can be controlled if it is carried out in the presence of $SiO_2$ or $GeO_2$.

The invention is a process for preparing alkali-metal cyanides labelled with C-14 isotope, comprising the steps of thermally decomposing Ba$^{14}$CO$_3$ at a temperature exceeding 720° C. in a hydrogen stream, in the presence of a compound selected from the group consisting of $SiO_2$, $GeO_2$ and a mixture thereof, transforming the carbon oxides formed through methane, in the presence of hydrogen and ammonia, over a catalyst, to hydrogen cyanide, absorbing the hydrogen cyanide in an alcoholic solution of an alkali-metal hydroxide, evaporating the solution obtained, and extracting the thus-formed alkali-metal cyanide with liquid ammonia.

A methanolic solution can be preferably used as an alcoholic solution of the alkali metal hydroxide. The absorption of the hydrogen cyanide and the extraction of the alkali metal cyanide are preferably carried out in the same vessel because in this way the extraction can be carried out without any loss of material. With the aid of the known processes, this could not be achieved because while transporting the material considerable losses of material occurred.

The invention relates also to an equipment for carrying out the above process, the said equipment comprising a decomposition tube, a contact tube connected to the said decomposition tube, containing a hydrogenating catalyst, a unit for binding water, connected to the said contact tube, a saturation vessel connected to the said water-binding unit, a contact tube connected to the saturation vessel and containing a catalyst consisting of platinum or platinum alloy, an absorption-extraction vessel connected to the said contact tube, and a pressure regulator connected to the said decomposition tube.

The absorption-extraction vessel consists preferably of a vertical inlet tube and an absorption tube connected to the lower end of the said vertical tube, the said absorption tube being arranged in relation to the said vertical tube at an angle of not more than 80°.

A preferable executional form of the equipment according to the invention is illustrated by the aid of the annexed drawing.

The decomposition tube 1 made of quartz glass is connected by means of cock 2 to the contact tube 3, made of glass and filled with nickel catalyst, in which the conversion of the carbon dioxide to methane takes place. The water being formed during the reaction is bound by the water trap 4 and absorber 5. The gas stream passes through the three-way cocks 6 and 7a into the saturating vessel 7, where the gas stream is saturated with liquid ammonia. Then the gas stream arrives to the contact tube 8, made of quartz glass and filled with platinum catalyst, in which the mehane is converted to hydrogen cyanide. The saturation vessel 7 can be disconnected from the hydrogen stream by turning the three-way cocks 7a and 7b. The gases pass through the three-way cock 9 into the absorption-extraction vessel 10 containing an alcoholic alkali-metal hydroxide solution. The gases leave the apparatus through the gas outlet tube 11.

The gas velocity can be controlled by means of the pressure regulator 12. The $H^{14}CN$ being formed in the apparatus is collected in the absorption vessel 10, and the extraction of the alkali-metal cyanide labelled with C–14 isotope is carried out in the same vessel, in the presence of liquid ammonia.

The labelled alkali cyanides prepared by the aid of the process and equipment according to the invention are free from any chemical or radiochemical contaminations, have a purity of analytical grade, and their molar activity is fully identical with that of the barium carbonate used as starting compound.

By the aid of the apparatus serving for carrying out the process, $Ba^{14}CO_3$ in a quantity of 2–4 millimoles can be transformed to $H^{14}CN$ in about 15 minutes. The amount of the $Ba^{14}CO_3$ transformed in the process can be increased at will. Depending on the amount and specific activity of the radioactive substance to be transformed, labelled alkali cyanides of an activity of several curies can be fully continuously prepared, within from 6 to 8 hours, without dismounting the apparatus. The transformation is practically without any loss, i.e. it is quantitative, and yields a product with much higher chemical purity than that of the products obtained with the known processes.

The molar activity of the alkali cyanides produced is fully identical with that of the barium carbonate used as starting material; consequently, alkali cyanides of extremely high and till now unattainable specific activities can be prepared.

The apparatus serving for carrying out the process is fully safe, its failure while operating is practically impossible.

The process according to the invention can be continuously and automatically carried out in a fully closed system. The danger of dispersing the activity is totally excluded. The apparatus complies in every respect with the standards of radiation safety and hygieny. No decontamination problems arise because the activity brought into the apparatus passes through the system during the reaction and leaves it in its total amount; due to dispersing, splashing or surface adsorption only a slight amount of activity remains in the apparatus, this slight amount being negligible both from preparative, analytical and radiochemical points of view.

Neither the process nor the equipment according to the invention require classified man power.

A very great advantage of the process according to the invention consists in the fact that it can be stopped at any moment without the danger of dispersing or destroying the active substances introduced into the apparatus. In the case of an unexpected danger, e.g. breakdown of the apparatus due to a mechanical injury, at most that fraction of the active substances is destroyed which in the given moment is present in gaseous phase over the catalyst surfaces; this amount is, however, not more than 0.5% of the total activity.

Both the process and the apparatus render possible to simultaneously work with high amounts of activity, in large scale, and to attain production costs much lower than those of the products obtained by the known processes.

The process according to the invention is based on chemical reactions which are readily controlled and can be carried out in a single equipment of safe operation. The capacity of the apparatus meets both preparative and plant requirements and at the same time it is suitable also for carrying out the conversion on a micro or semi-micro scale. The reactions can be exactly controlled and accurately registered and give reproducible results. The continuous mode of operation lends itself for automatation which, from the point of view of labour safety, is an essential requirement while processing large quantities of radioactive substances.

Summing up, the process and apparatus according to the invention are better, more practical, more convenient, safer and less expensive than those known till now.

The process according to the invention is further illustrated by the aid of the following examples.

EXAMPLE 1

The saturating vessel 7 of the apparatus in FIG. 1 is placed into a cooling mixture of acetone and solid carbon dioxide and then it is filled up with liquid ammonia. The apparatus is heated up in a slow hydrogen stream.

During the heating period, the vessel 7 is disconnected from the gas stream by suitably turning the cocks 7a and 7b, and the water trap 4 is placed into a cooling mixture of acetone and solid carbon dioxide. The decomposition tube 1 is heated up to 850° C., the contact tube 3 to 350° C., and the contact tube 8 to 1150° C. The saturating vessel 7 is connected into the gas stream by turning the cocks 7a and 7b.

409.5 mg. of $Ba^{14}CO_3$ are measured into a platinum vessel of 10 x 10 x 60 mm., whereafter the radioactive material is mixed with powdered quartz of about the same quantity. 4.5 ml. of 1 N potassium hydroxide solution in absolute methanol is filled into the absorption-extraction vessel 10, whereafter the vessel is joined through cock 9 to the contact tube 8. While the apparatus is rinsed in counter-current with hydrogen the platinum vessel is put into the decomposing tube 1 heated to 850° C.

Thereafter the cocks 2, 7a, 7b and 9 are turned according to the original direction of the hydrogen stream, whereby the saturating vessel 7 is inserted into the way of the gas stream. Consequently, the hydrogen stream is saturated with ammonia.

Then the temperature of the decomposing tube is increased to 950° C. in 4–5 minutes and held for further 15 minutes at this value. Thereafter the temperature is raised to 1050° C., and the thermal decomposition of the $Ba^{14}CO_3$ is completed during further 15 minutes.

Then the temperature of the decomposition tube 1 is reset to 850° C. The ammonia is disconnected from the gas stream by turning the cocks 7a and 7b and the methanol is distilled off from the absorption-extraction vessel 10. The distillation residue is evaporated to dryness.

Thereafter liquid ammonia is condensed into the absorption-extraction vessel 10. The solution of ammonia containing $K^{14}CN$ is filtered into the vessel serving for finishing the product and there it is evaporated at room temperature.

The product remained in the vessel consists of $K^{14}CN$ of analytical purity in an amount of 132.1 mg. which corresponds to a yield of 97.8%. After closing the vessel, this product can directly be brought into circulation.

EXAMPLE 2

One proceeds as described in Example 1 with the differences that 418.0 mg. of $Ba^{14}CO_3$ are used as starting material, the production of carbon oxides is carried out, instead of at 350° C., at a temperature of 400° C., and the methane conversion is carried out, instead of 1500° C., at a temperature of 1175° C. The hydrogen cyanide is absorbed in a 1.1 N solution of sodium-hydroxide in abs. methanol.

The weight of the $Na^{14}CN$ obtained of analytical purity amounts to 102.9 mg. which corresponds to a yield of 99.2%.

For determining the yields in the examples, the potassium and sodium cyanides, respectively, were titrated by Denige's method.

What we claim is:

1. A process for preparing alkali-metal cyanides labelled with C–14 isotope, comprising the steps of thermally decomposing $Ba^{14}CO_3$ in a hydrogen stream at a temperature exceeding 720° C., in the presence of a compound selected from the group consisting of $SiO_2$, $GeO_2$ and a mixture thereof, transforming the carbon oxides being formed through methane, in the presence of hydrogen and ammonia, over a catalyst to hydrogen cyanide labelled with C–14 isotope, absorbing said hydrogen cyanide in an alcoholic solution of an alkali-metal hydroxide, evaporating the solution obtained, and extracting the thus-formed alkali-metal cyanide labelled with C–14 istope with liquid ammonia.

No references cited.

O. R. VERTIZ, Primary Examiner

L. A. MARSH, Assistant Examiner